United States Patent [19]

Peier

[11] Patent Number: 5,016,742

[45] Date of Patent: May 21, 1991

[54] LIQUID FRICTION COUPLING

[75] Inventor: Othmar Peier, Pöllau, Austria

[73] Assignee: Steyr-Daimler-Puch AG, Vienna, Austria

[21] Appl. No.: 517,321

[22] Filed: May 1, 1990

[30] Foreign Application Priority Data

May 2, 1989 [AT] Austria ............................... 1035/89

[51] Int. Cl.$^5$ .......................................... F16D 31/00
[52] U.S. Cl. ............................. 192/58 C; 192/70.28; 192/85 AA
[58] Field of Search ............ 192/58 C, 70.28, 85 AA, 192/113 B, 57

[56] References Cited

U.S. PATENT DOCUMENTS

| | | | |
|---|---|---|---|
| 4,782,930 | 11/1988 | Kuroiwa et al. | 192/58 C |
| 4,844,219 | 7/1989 | Stockmar | 192/58 C |
| 4,874,058 | 10/1989 | Kwoka | 192/58 C |

FOREIGN PATENT DOCUMENTS

| | | |
|---|---|---|
| 384086 | 9/1987 | Austria . |
| 0005927 | 5/1970 | European Pat. Off. . |
| 0332608 | 3/1989 | European Pat. Off. . |
| 629716 | 5/1935 | Fed. Rep. of Germany . |
| 1185426 | 1/1965 | Fed. Rep. of Germany . |
| 1051678 | 1/1965 | United Kingdom . |

*Primary Examiner*—Allan D. Herrmann
*Assistant Examiner*—Andrea Pitts
*Attorney, Agent, or Firm*—Marmorek, Guttman & Rubenstein

[57] ABSTRACT

A liquid friction coupling comprises a housing that contains a viscous liquid, a shaft protruding into said housing, alternating and interdigitating inner and outer blades, which are axially slidably and non-rotatably connected to the shaft and to the housing, respectively, annular expanding springs, which extend between adjacent inner blades or outer blades, and an annular piston, which is sealed in the housing and axially displaceable therein and is operable from the outside and arranged to act on the blades in order to change the blade spacing. In order to increase the range in which the blade spacing can be controlled and possibly to permit the coupling to be used as a clutch coupling, the volume of the viscous liquid which is contained in the housing equals the total volume of the free spaces in the housing outside the outer periphery of the inner blades when the piston is in the position which corresponds to the largest blade spacing.

1 Claim, 1 Drawing Sheet

LIQUID FRICTION COUPLING

BACKGROUND OF THE INVENTION

1Field of the Invention

This invention relates to a liquid friction coupling, which comprises a housing that contains a viscous liquid, a shaft protruding into said housing, alternating and interdigitating inner and outer blades which are axially slidably and non-rotatably connected to the shaft and to the housing, respectively, annular expanding springs, which extend between adjacent inner blades or outer blades, and an annular piston, which is sealed in the housing and axially therein and is operable from the outside and arranged to act on the blades in order to change the blade spacing.

2. Description of the Prior Art

Such a liquid friction coupling is already known from Austrian Patent Specification No. 384,086 and the corresponding U.S. Pat. No. 4,844,219, the disclosure of which is incorporated herein by reference. In that known coupling the width of the gaps between adjacent inner and outer blades can be changed to control the slip of the speed of the driven part of the coupling because the coupling effect and/or the torque being transmitted is approximately inversely proportional to the width of the gap. But it has been found that the control range is relatively small in practice particularly because it has not been taken into account in the known proposal that the free space within the housing should be minimized. Besides, even when the blade spacing is large the gaps between adjacent inner and outer blades will always contain liquid so that torque will still be transmitted. For this reason a motor vehicle which has two driven axles and is provided with such a coupling often requires additional means for interrupting the power train extending between the axles if an improved handling of the vehicle is to be ensured during braking.

SUMMARY OF THE INVENTION

For this reason it is an object of the invention so to improve the liquid friction coupling described first hereinbefore that its control range can considerably be increased and even an operation involving no liquid friction and no torque transmission at all will be enabled and this can be accomplished with very simple means.

This object is accomplished in accordance with the invention in that the volume of the viscous liquid which is contained in the housing equals the total volume of the free spaces in the housing outside the outer periphery of the inner blades when the piston is in the position which corresponds to the largest blade spacing.

The invention is based on the recognition that during a rotation of the liquid friction coupling the centrifugal force acting on the liquid will effect a segregation of liquid and air and will cause said liquid to form an annular body of liquid, which adjoins the inside peripheral surface of the housing. If the total volume of those free spaces which lie in the housing outside the outer periphery of the inner blades has the stated magnitude relative to the amount of liquid, no liquid will be disposed between the inner blades when the piston is in the position which corresponds to the largest blade spacing so that no torque can then be transmitted. In that case it will obviously be required for a satisfactory function that during an inward movement of the piston in order to reduce the width of the gaps adjacent inner and outer blades the liquid will be compelled to escape into said gaps so that the torque being transmitted will increase. In dependence on the dimensions the torque being transmitted can be increased to such a magnitude that the two parts of the coupling are non-rotatably connected to each other. In order to avoid an existance of spaces into which the liquid could escape during an inward movement of the annular piston, that piston has at its end facing the blades a continuous planar end face which is normal to the axis of the coupling.

If the liquid friction coupling is incorporated in a motor vehicle it will be required that the torque being transmitted by the coupling can be decreased quickly so that the two driven axles can quickly be disconnected in order to ensure a stable handling of the vehicle during a braking thereof.

In the present coupling that effect is ensured during a quick outward movement of the piston in the torque-decreasing direction because various results are produced by the features of the invention. For instance, the fact that the annular body of liquid is free of air will have the result that a certain suction will be exerted if the piston is moved as fast as possible in the outward direction so that part of the liquid will be sucked out of the gaps between adjacent inner and outer blades. At the same time the highly compressed air inside the liquid friction coupling will force the liquid out of said gaps so that cushions of air will be formed between adjacent inner and outer blades. It will be understood that the centrifugal force acting on the liquid constitutes an additional radially outwardly directed force, by which a complete escape of the liquid out of said gaps will be ensured. In that case the widening of said gaps will facilitate the flow of liquid out of said gaps and will more than proportionately reduce the average local fill factor i.e., the quotient of the volume of liquid contained in the region in which adjacent inner and outer blades which define a given gap overlap, and the entire volume. There is no need to specify the required viscosity of the liquid.

DETAILED DESCRIPTION OF THE PREFERRED EMBODIMENT

Figure 1:
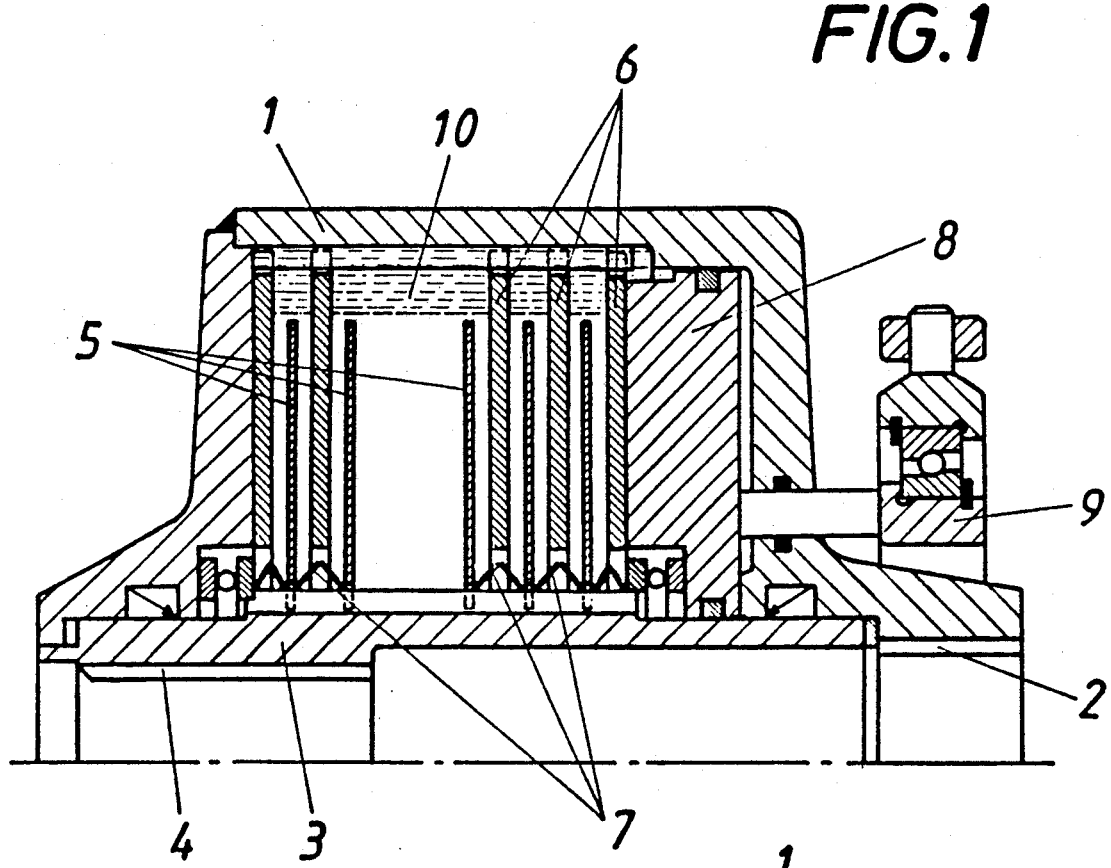
FIG. 1 is an axial sectional view showing a liquid friction coupling in a position in which no torque is transmitted.

The liquid friction coupling comprises a housing 1, which is adapted to be non-rotatably connected by splines 2 to a shaft, not shown. The coupling also comprises a tubular shaft 3, which protrudes into the housing 1 and is provided with splines for a connection to an external shaft that is to be coupled. The housing 1 contains a viscous liquid and also contains interdigitating inner blades 5 and outer blades 6, which are arranged in alternation and are axially slidably and non-rotatably connected to the tubular shaft 3 and the housing 1, respectively. Disk springs 7 are provided between adjacent inner and outer blades 5 and 6 and urge said adjacent blades apart. An annular piston 8 is disposed in the housing 1 and at the end which faces the blades 5, 6 has a perfectly planar end face. That piston can be displaced from the outside of the housing 1 by means of an adjusting ring 9 in order to change the spacing of the blades 5, 6.

During a rotation of the coupling, a centrifugal force will be generated which causes the viscous liquid contained in the coupling to form an annular body of liquid 10. When the piston 8 is in the position which is shown in FIG. 1 and corresponds to the largest blade spacing, the volume of liquid contained in the housing equals the volume of the free spaces which exist in the housing 1 outside the outer periphery of the inner blades 5. The disk springs 7 always ensure that the gaps between adjacent inner and outer blades will have a uniform width within the entire set of blades regardless of the position of the annular piston 8.

Figure 2:
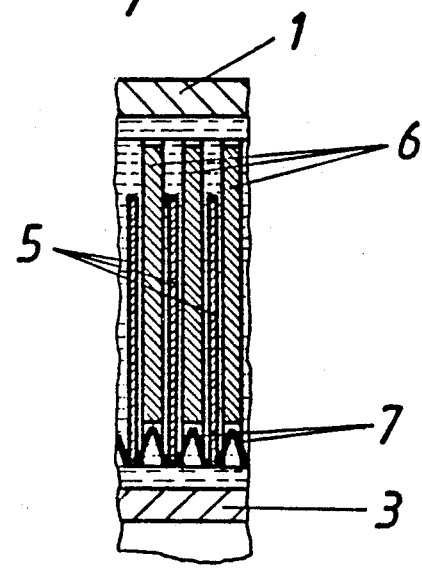
FIG. 2 shows a portion of the coupling with gaps of minimum width between adjacent inner and outer blades.

The annular piston 8 can be moved inwardly to the position which is shown in FIG. 2 to reduce the width of the gaps to a minimum. That position may be defined by a stop or in that the springs 7 are entirely flattened. During such inward movement of the piston 8 the viscous liquid is forced to flow from the annular body of liquid 10 into gaps remaining between adjacent inner and outer blades 5 and 6.

From the foregoing description and the drawing it is apparent that the coupling comprises a first set of axially spaced apart inner blades 5, which are axially slidably mounted on and non-rotatably connected to the tubular shaft 3 and have outer peripheries which are radially inwardly spaced from the housing 1 and define with said housing an annular space. A second set of axially spaced apart outer blades 6 are provided, which alternate and interdigitate with the inner blades 5 and are axially slidably mounted in and non-rotatably connected to said housing 1 and extend radially through said annular space. A plurality of annular expanding springs 7 are provided, each of which is disposed between adjacent inner blades 5 and urges said adjacent blades apart. An annular piston 8 is axially slidably mounted and sealed in said housing and is axially operable from the outside of said housing to act on the blades 5, 6 in order to control the axial spacing of adjacent ones of the blades 5, 6. The piston 8 is axially movable to and from a predetermined position, which is shown in FIG. 1 and which determines a largest possible axial spacing of the blades 5, 6 and in which said annular space inasmuch as it is not occupied by said outer blades 6 has a predetermined volume. The viscous liquid 10 which is contained in the housing 1 has in a gas-free state a volume which is not in excess of said predetermined volume.

I claim:

1. In a liquid friction coupling comprising
a housing,
a viscous liquid contained in said housing,
a shaft protruding into said housing,
a first set of axially spaced apart inner blades, which are axially slidably mounted on and non-rotatably connected to said shaft and have outer peripheries which are radially inwardly spaced from said housing and define with said housing an annular space,
a second set of axially spaced apart outer blades, which alternate and interdigitate with said inner blades and are axially slidably mounted in and non-rotatably connected to said housing and extend radially through said annular space,
a plurality of annular expanding springs, each of which is disposed between adjacent blades of one of said sets and urges said adjacent blades apart, and
an annular piston, which is axially slidably mounted and sealed in said housing and is axially operable from the outside of said housing to act on said blades in order to control the axial spacing of adjacent ones of said blades and is axially movable to and from a predetermined position which determines a largest possible axial spacing of said blades and in which said annular space inasmuch as it is not occupied by said outer blades has a predetermined volume,
the improvement residing in that the quantity of said viscous liquid which is contained in said housing has in a gas-free state a volume which is not in excess of said predetermined volume.

* * * * *